US012393145B2

(12) United States Patent
Yasuda et al.

(10) Patent No.: US 12,393,145 B2
(45) Date of Patent: Aug. 19, 2025

(54) FIXING DEVICE AND IMAGE FORMING APPARATUS WITH NIP PORTION THAT PREVENTS BELT CRACKING AND OIL LEAKAGE

(71) Applicant: CANON KABUSHIKI KAISHA, Tokyo (JP)

(72) Inventors: Shuhei Yasuda, Ibaraki (JP); Akiyoshi Shinagawa, Saitama (JP); Suguru Takeuchi, Chiba (JP); Yasuharu Toratani, Chiba (JP); Ayano Saito, Chiba (JP); Kengo Koyama, Chiba (JP); Shigeru Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/425,575

(22) Filed: Jan. 29, 2024

(65) Prior Publication Data

US 2024/0264557 A1 Aug. 8, 2024

(30) Foreign Application Priority Data

Feb. 3, 2023 (JP) ................................ 2023-014988

(51) Int. Cl.
*G03G 15/20* (2006.01)

(52) U.S. Cl.
CPC ..... *G03G 15/2053* (2013.01); *G03G 15/2025* (2013.01); *G03G 15/2064* (2013.01)

(58) Field of Classification Search
None
See application file for complete search history.

(56) References Cited

U.S. PATENT DOCUMENTS

| | | | | |
|---|---|---|---|---|
| 9,804,547 | B2 * | 10/2017 | Yamagishi | G03G 15/206 |
| 2007/0071520 | A1 * | 3/2007 | Tsuchiya | G03G 15/2064 399/329 |
| 2007/0282051 | A1 * | 12/2007 | Okano | G03G 15/162 524/495 |
| 2012/0148816 | A1 * | 6/2012 | Wu | G03G 15/2053 977/734 |
| 2014/0242412 | A1 * | 8/2014 | Sugiyama | B32B 15/043 428/623 |
| 2018/0017910 | A1 * | 1/2018 | Sawada | G03G 15/2053 |

(Continued)

FOREIGN PATENT DOCUMENTS

| | | |
|---|---|---|
| JP | 2009069585 A | 4/2009 |
| JP | 2009086105 A | 4/2009 |

(Continued)

*Primary Examiner* — Arlene Heredia
(74) *Attorney, Agent, or Firm* — Canon U.S.A., Inc. IP Division

(57) ABSTRACT

A fixing device includes an endless belt configured to heat a recording material, a pressure member contacting an outer circumferential surface of the endless belt to form a nip portion, and a pad. A length of the endless belt is larger than a length of the pad in a width direction of the endless belt. The pad includes a first surface forming the nip portion, a second surface facing the first surface, and a third surface connecting the first surface and the second surface in the width direction and formed in a conveyance direction of the recording material. And the third surface has a curved shape in a cross section orthogonal to the conveyance direction of the recording material.

9 Claims, 10 Drawing Sheets

(56) References Cited

U.S. PATENT DOCUMENTS

| | | | | |
|---|---|---|---|---|
| 2020/0089147 | A1* | 3/2020 | Hasegawa .......... | G03G 15/2025 |
| 2023/0273554 | A1* | 8/2023 | Matsuura ........... | G03G 15/2064<br>399/328 |
| 2023/0273555 | A1* | 8/2023 | Kawai ................ | G03G 15/2025<br>399/329 |

FOREIGN PATENT DOCUMENTS

| | | | |
|---|---|---|---|
| JP | 2017125889 | A | 7/2017 |
| JP | 2017181948 | A | 10/2017 |

* cited by examiner

FIG. 10A

| | |
|---|---|
| E | 5000 MPa |
| t | 0.08 mm |
| L | 10 mm |

| R [mm] | CRACK | OIL LEAKAGE |
|---|---|---|
| 1.0 | PRESENT | ABSENT |
| 1.5 | PRESENT | ABSENT |
| 2.0 | ABSENT | ABSENT |
| 4.0 | ABSENT | ABSENT |
| 6.0 | ABSENT | ABSENT |
| 8.0 | ABSENT | PRESENT |
| 10.0 | ABSENT | PRESENT |

FIG. 10B

| | |
|---|---|
| E | 3500 MPa |
| t | 0.08 mm |
| L | 10 mm |

| R [mm] | CRACK | OIL LEAKAGE |
|---|---|---|
| 1.0 | PRESENT | ABSENT |
| 1.5 | PRESENT | ABSENT |
| 2.0 | ABSENT | ABSENT |
| 4.0 | ABSENT | ABSENT |
| 6.0 | ABSENT | ABSENT |
| 8.0 | ABSENT | PRESENT |
| 10.0 | ABSENT | PRESENT |

FIG. 10C

| | |
|---|---|
| E | 5000 MPa |
| t | 0.1 mm |
| L | 10 mm |

| R [mm] | CRACK | OIL LEAKAGE |
|---|---|---|
| 1.0 | PRESENT | ABSENT |
| 1.5 | PRESENT | ABSENT |
| 2.0 | PRESENT | ABSENT |
| 4.0 | ABSENT | ABSENT |
| 6.0 | ABSENT | ABSENT |
| 8.0 | ABSENT | PRESENT |
| 10.0 | ABSENT | PRESENT |

FIG. 10D

| | |
|---|---|
| E | 5000 MPa |
| t | 0.08 mm |
| L | 5 mm |

| R [mm] | CRACK | OIL LEAKAGE |
|---|---|---|
| 1.0 | PRESENT | ABSENT |
| 1.5 | PRESENT | ABSENT |
| 2.0 | ABSENT | ABSENT |
| 4.0 | ABSENT | PRESENT |
| 6.0 | ABSENT | PRESENT |
| 8.0 | ABSENT | PRESENT |
| 10.0 | ABSENT | PRESENT |

FIXING DEVICE AND IMAGE FORMING APPARATUS WITH NIP PORTION THAT PREVENTS BELT CRACKING AND OIL LEAKAGE

BACKGROUND

Field of the Disclosure

The present disclosure relates to an image forming apparatus that forms an image on a recording material, and a fixing device.

Description of the Related Art

In recent years, an on-demand printing market has been expanding in which commercial printed materials, such as catalogs, posters, and brochures, are printed in the necessary number of copies. An electrophotographic image forming apparatus that performs on-demand printing is required to reduce the printing time. In order to achieve a reduction in the printing time, it is necessary to increase efficiency of heating the recording material when a toner image is fixed to the recording material. Thus, in order to increase the heating efficiency, it has been proposed to widen a fixing nip. Further, a fixing device is proposed which prevents an occurrence of paper wrinkling by flattening the fixing nip.

In a case where the fixing nip is made flat, an endless belt and a nip forming member that forms a flat nip on an inner circumferential surface of the belt are used. The belt rotates to convey the recording material. The belt and the nip forming member slide on each other by rotation of the belt. In order to smooth the sliding, a configuration in which oil is applied to the inner side of the belt is discussed (Japanese Patent Application Laid-Open No. 2017-181948).

The belt is longer than the nip forming member in the width direction of the belt so that the oil applied to the inner side of the belt does not leak to the outer side of the belt. However, since the belt is a suspended member, if the belt is longer than the nip forming member in the width direction, stress is concentrated on end portions of the nip forming member that comes in contact with the belt.

SUMMARY

The present disclosure is directed to reducing sliding resistance between a nip forming member and a belt in a fixing device in which oil is applied to an inner circumferential surface of the belt.

According to an aspect of the present disclosure, a fixing device includes an endless belt configured to heat a recording material and having an inner circumferential surface coated with oil, a pressure member contacting an outer circumferential surface of the endless belt to form a nip portion, and a pad disposed on the inner circumferential surface of the endless belt and configured to form the nip portion together with the pressure member via the endless belt, wherein the pressure member applies heat and pressure to the recording material carrying a toner image at the nip portion together with the endless belt to fix the toner image to the recording material, wherein a length of the endless belt is larger than a length of the pad in a width direction of the endless belt, and the pad includes a first surface forming the nip portion, a second surface facing the first surface, and a third surface connecting the first surface and the second surface in the width direction and formed in a conveyance direction of the recording material, and wherein the third surface has a curved shape in a cross section orthogonal to the conveyance direction of the recording material.

Further features of the present disclosure will become apparent from the following description of exemplary embodiments with reference to the attached drawings.

BRIEF DESCRIPTION OF THE DRAWINGS

FIGS. 10A, 10B, 10C, and 10D are tables illustrating conditions for achieving both belt durability and oil leakage prevention.

DESCRIPTION OF THE EMBODIMENTS

<Image Forming Apparatus>

A general configuration of an image forming apparatus according to an exemplary embodiment will be described with reference to FIG. 1.

Figure 1:
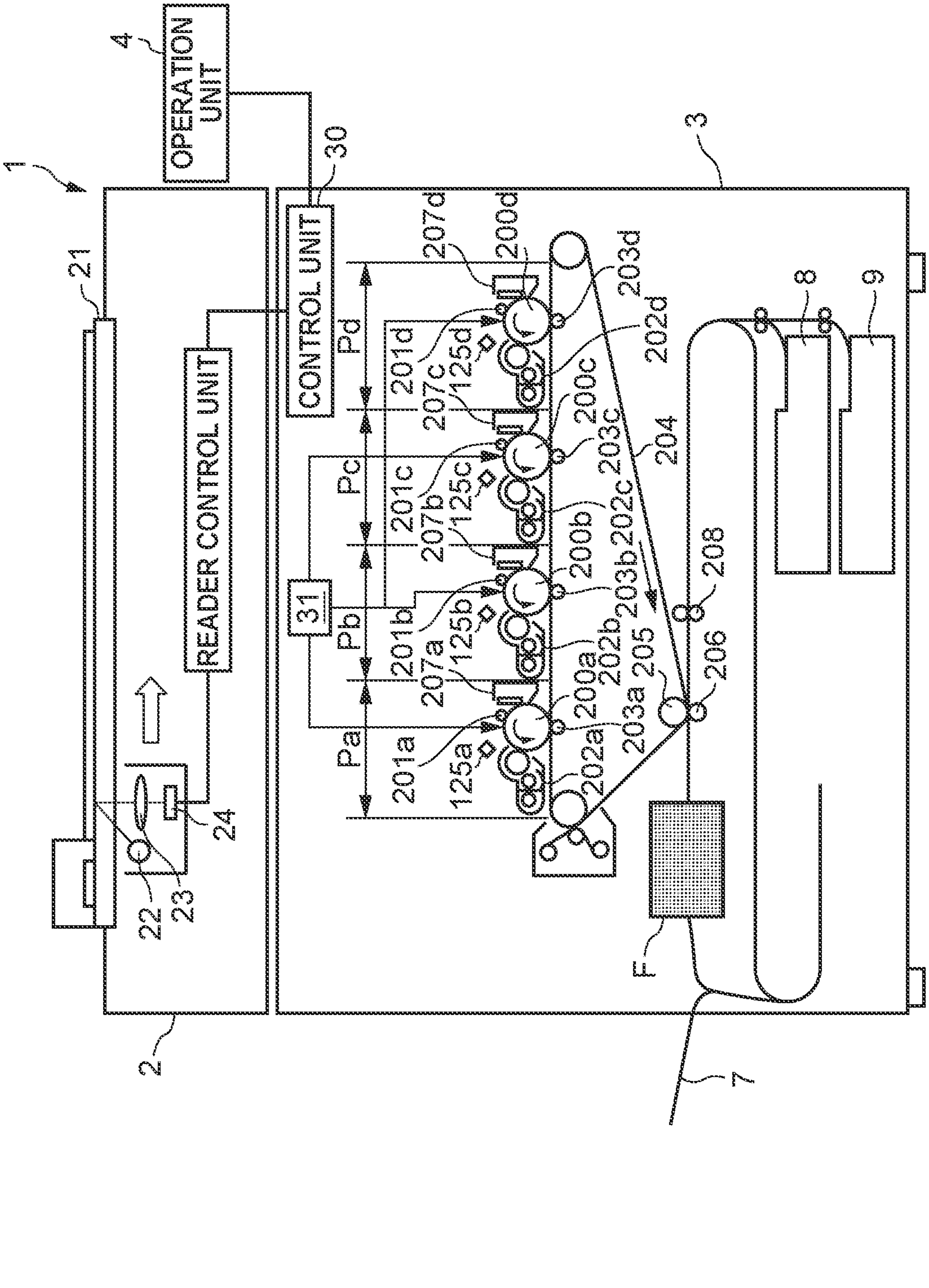
FIG. 1 is a schematic diagram illustrating an image forming apparatus.

FIG. 1 is a diagram illustrating a full-color image forming apparatus according to the present exemplary embodiment. An image forming apparatus 1 includes an image reading unit 2 and an image forming apparatus main body 3. The image reading unit 2 reads a document placed on an original platen glass 21. Light emitted from a light source 22 is reflected by a document, and an image is formed on a charge-coupled device (CCD) sensor 24 via an optical system member 23, such as a lens. Such an optical system unit scans the document in a direction of a white arrow to convert the document into an electric signal data string for each line. An image signal obtained by the CCD sensor 24 is transmitted to the image forming apparatus main body 3, and a control unit 30 performs image processing suitable for each image forming unit described below. The control unit 30 also receives an external input from an external host apparatus, such as a print server, as an image signal.

The image forming apparatus main body 3 includes a plurality of image forming units Pa, Pb, Pc, and Pd, and each of the image forming units forms an image based on the above-described image signal. More specifically, the image signal is converted into a laser beam subjected to pulse width modulation control (PWM) by the control unit 30. In FIG. 1, polygon scanners 31 as exposure devices emit laser beams corresponding to the image signal. Then, photosensitive drums 200*a* to 200*d* as image bearing members of the respective image forming units Pa to Pd are irradiated with the laser beams.

The image forming unit Pa is a yellow (Y) image forming unit, the image forming unit Pb is a magenta (M) image forming unit, the image forming unit Pc is a cyan (C) image forming unit, and the image forming unit Pd is a black (Bk) image forming unit, which form images of corresponding colors. Since the image forming units Pa to Pd are substantially the same, the Y image forming unit Pa will be described in detail below, and descriptions of the other image forming units Pb, Pc, and Pd will be omitted. In the Y image forming unit Pa, a toner image is formed on the photosensitive drum 200*a* based on an image signal as described below.

A primary charger 201*a* charges a surface of the of the photosensitive drum 200*a* to a predetermined potential. The laser beam from the polygon scanner 31 forms an electrostatic latent image on the surface of the photosensitive drum 200*a* charged to the predetermined potential. A developing device 202*a* develops the electrostatic latent image on the photosensitive drum 200*a* to form a toner image. A transfer roller 203*a* applies a primary transfer bias having a polarity opposite to that of toner by discharging from the back surface of an intermediate transfer belt 204, and transfers the toner image on the photosensitive drum 200*a* onto the intermediate transfer belt 204. The surface of the photosensitive drum 200*a* after the transfer is cleaned by a cleaner 207*a*. The toner image on the intermediate transfer belt 204 is conveyed to the next image forming unit. Toner images of the respective colors formed by the respective image forming units are sequentially transferred on the intermediate transfer belt 204 in the order of Y, M, C, and Bk, and a four-color image is formed on the surface thereof. The toner image that has passed through the Bk image forming unit Pd is conveyed to a secondary transfer unit composed of a pair of secondary transfer rollers 205 and 206. At the secondary transfer unit, the toner image is secondarily transferred onto a recording material P by applying a secondary transfer field having a polarity opposite to that of the toner image on the intermediate transfer belt 204. The recording material P fed from a sheet feeding cassette 8 or 9 is on standby at a registration portion 208. Then, a timing is controlled to align the toner image on the intermediate transfer belt 204 with the recording material P, and the recording material P is conveyed from the registration portion 208. Thereafter, the toner image on the recording material P is fixed on the recording material P by a fixing device F as an image heating device. After passing through the fixing device F, the recording material P is discharged to the outside. In the case of a double-sided job, when the transfer and fixing of toner on a first surface (first side) of image formation are completed, the processing shifts to a step of image formation on a second side. The recording material P having the first side fixed is turned over through a reversing portion provided inside the image forming apparatus. Thereafter, a toner image is formed on the second side and fixed. The recording material with the toner fixed on both sides is discharged to the outside of the apparatus and stacked on a sheet discharge tray 7.

Next, a configuration of the fixing device F according to the present exemplary embodiment will be described with reference to FIG. 2.

<Fixing Device>

Figure 2:
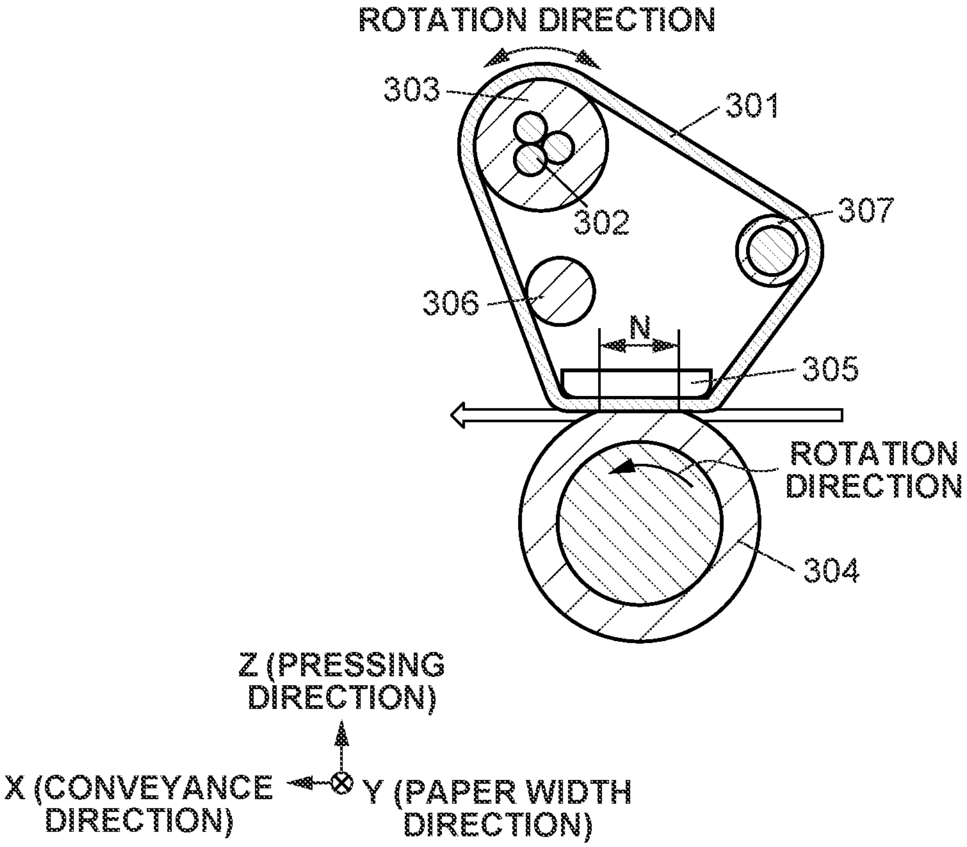
FIG. 2 is a schematic diagram illustrating a cross section of a fixing device according to one exemplary embodiment.

FIG. 2 is a schematic view of an overall configuration of the fixing device F of a belt heating type according to the present exemplary embodiment. In the drawing, an X direction indicates a recording material conveyance direction, a Y direction indicates a belt width direction, and a Z direction indicates a pressing direction in which a pressure roller 304 presses a pad.

The fixing device F includes a fixing belt (hereinafter, referred to as a "belt") 301 as an endless rotatable heating rotary member. A heating roller (heating member) 303, a pad 305 serving as a nip forming member, and a steering roller 307 are disposed on the inner circumferential surface of the belt 301. Further, an oil application roller 306 as an oil application member for applying oil to the inner circumferential surface of the belt 301 is disposed. A halogen heater 302 as a heat source is disposed inside the heating roller 303. The fixing device F further includes a pressure roller (pressure member) 304 that contacts an outer circumferential surface of the belt 301 and forms a fixing nip portion (hereinafter, referred to as a nip) N together with the pad 305 serving as a nip forming member via the belt 301.

The belt 301 has thermal conductivity and heat resistance, and has a thin cylindrical shape. In the present exemplary embodiment, the belt 301 has a three layer structure in which a base layer, an elastic layer, and a release layer are formed in this order from the inner side. The base layer is 80 micrometers (μm) thick and is made of polyimide resin (PI). The elastic layer is 300 μm thick and is made of silicone rubber. The release layer is 30 μm thick and is made of tetrafluoroethylene-perfluoroalkoxyethylene copolymer resin (PFA) as a fluororesin. In the belt 301 of the present exemplary embodiment, the heating roller 303, the pad 305, the oil application roller 306, and the steering roller 307 are in contact with the inner circumferential surface of the belt 301.

The outer diameter of the belt 301 is 150 mm.

The heating roller 303 is a stainless steel pipe having a thickness of 1 mm. The halogen heater 302 as a heating source is disposed inside the heating roller 303, and the heating roller 303 can generate heat up to a predetermined temperature. The heating roller 303 is disposed downstream of the pad 305 in a rotation direction of the belt 301. The belt 301 is heated by the heating roller 303. The heating roller 303 of the present exemplary embodiment is configured to be rotationally driven by a motor. The heating roller 303 is rotationally driven, so that the belt 301 is stretched around the pad 305 and the heating roller 303.

The pressure roller 304 is formed of a core metal layer as a shaft, an elastic layer, and a release layer.

The core metal layer is made of a steel use stainless (SUS) member having a diameter of 72 mm. The elastic layer is formed on an outer circumferential surface of the core metal layer, is 8 mm thick, and is made of a conductive silicone rubber. The release layer is formed on an outer circumferential surface of the elastic layer, is 100 μm thick, and is made of PFA as a fluororesin. The pressure roller 304 is axially supported by a frame of the fixing device F, and a gear is fixed to one end portion of the pressure roller 304. The pressure roller 304 is connected to a driving source via the gear to be rotationally driven.

Figure 3:
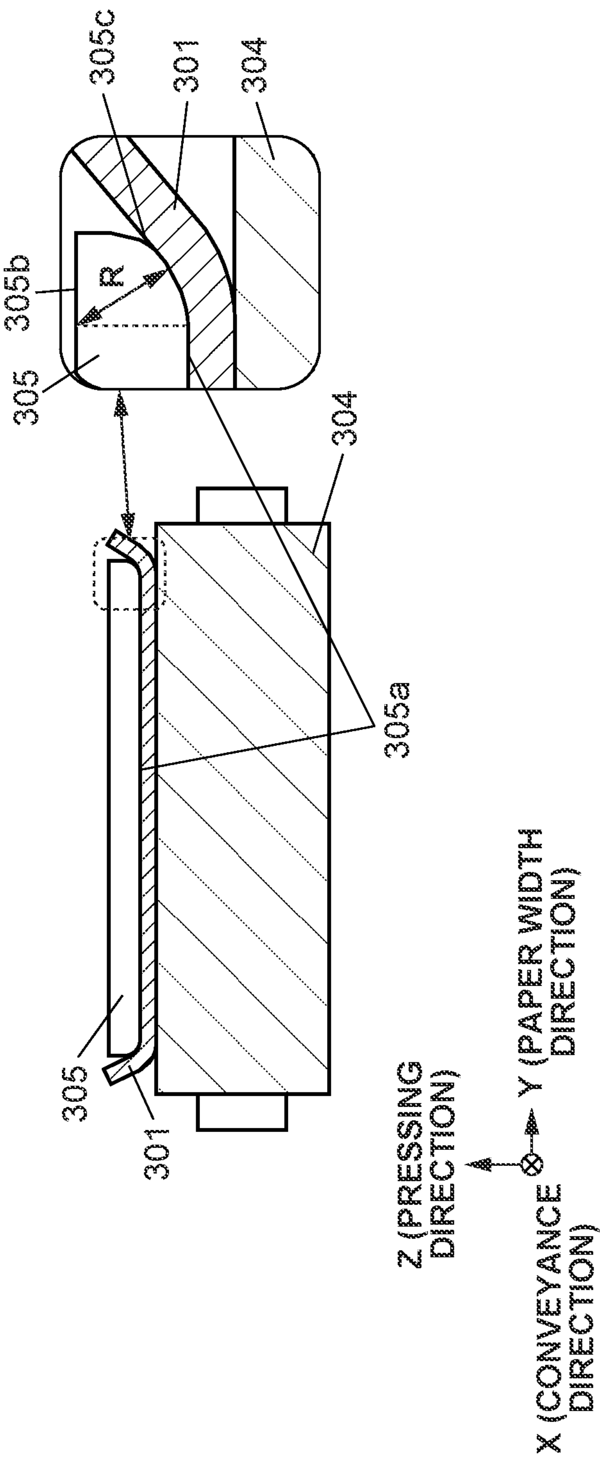
FIG. 3 is an enlarged view illustrating a nip portion according to the present exemplary embodiment.

The pad 305 forms a nip portion N together with the pressure roller 304 via the belt 301. The pad 305 is made of a liquid crystal polymer (LCP) resin. As illustrated in FIG. 3, the pad 305 has a corner with R=4 mm in the width direction. R is not limited to 4 mm, and may be in a range of 2.0 to 8.0 mm.

The oil application roller 306 applies oil as a lubricant to the inner circumferential surface of the belt 301 to enable the belt 301 to smoothly slide with respect to the pad 305. In the present exemplary embodiment, the roller is used as an oil application member, but the oil application member is not limited thereto. Any configuration may be adopted as long as the oil can be applied to the belt 301. For example, an oil application member may be a felt or the like that is a non-rotating body and is impregnated with oil brought into contact with the inner circumferential surface of the belt 301. Any oil application member may be used as long as it can apply oil to the inner circumferential surface of the belt 301.

The steering roller 307 applies a predetermined amount of tension to the belt 301 by pressing the belt 301 from the inside to the outside of the belt 301 by a spring. The steering roller 307 adjusts the position of the belt 301 in the Y direction by controlling an inclination in the Y direction. The steering roller 307 is disposed upstream of the pad 305 in the rotation direction of the belt 301.

The belt 301 stretched around the plurality of stretching members is rotated with rotation of the pressure roller 304. The belt 301 is moved in the width direction by the steering roller 307 with the rotation, so that the position of an edge of an end portion of the recording material can be shifted.

As a result, what is called an edge damage can be prevented, and improvement in image quality can be achieved. The steering roller 307 has a swing center and can move the belt 301 in the width direction by swinging.

At a nip portion N formed between the belt 301 and the pressure roller 304, the recording material bearing a toner image is subjected to heat and pressure. As a result, the unfixed toner image on the recording material is fixed to the recording material by passing through the nip portion N.

In the present exemplary embodiment, settings are such that a pressing force at the nip portion N during printing is 1600 newton (N), and the nip portion N is 24.5 mm long in the X direction (conveyance direction) and 326 mm wide in the Y direction (paper width direction). However, the present exemplary embodiment is not limited to such settings, and the above-described pressing force and the length and width of the nip portion N can be freely changed as long as the toner image on the recording material can be fixed.

In the present exemplary embodiment, slidability between the belt 301 and the pad 305 is improved by using oil. However, there is a possibility that the oil leaks from the inner circumferential surface of the belt 301. A reason for occurrence of the leak is that the pressing force is applied to the nip portion N. A strong force is generated at the nip portion N between the belt 301 and the pad 305, so that the oil is pushed outward in the width direction. This causes the oil to leak out of the belt 301. In order to prevent this, the length of the belt 301 in the width direction (Y direction) is set to be larger than the length of the pad 305 in the width direction.

However, if the length of the belt 301 in the width direction (Y direction) is larger than the length of the pad 305 in the width direction, a crack can be generated in the belt 301.

<Cracks Occurring in Fixing Belt>

Figure 4:
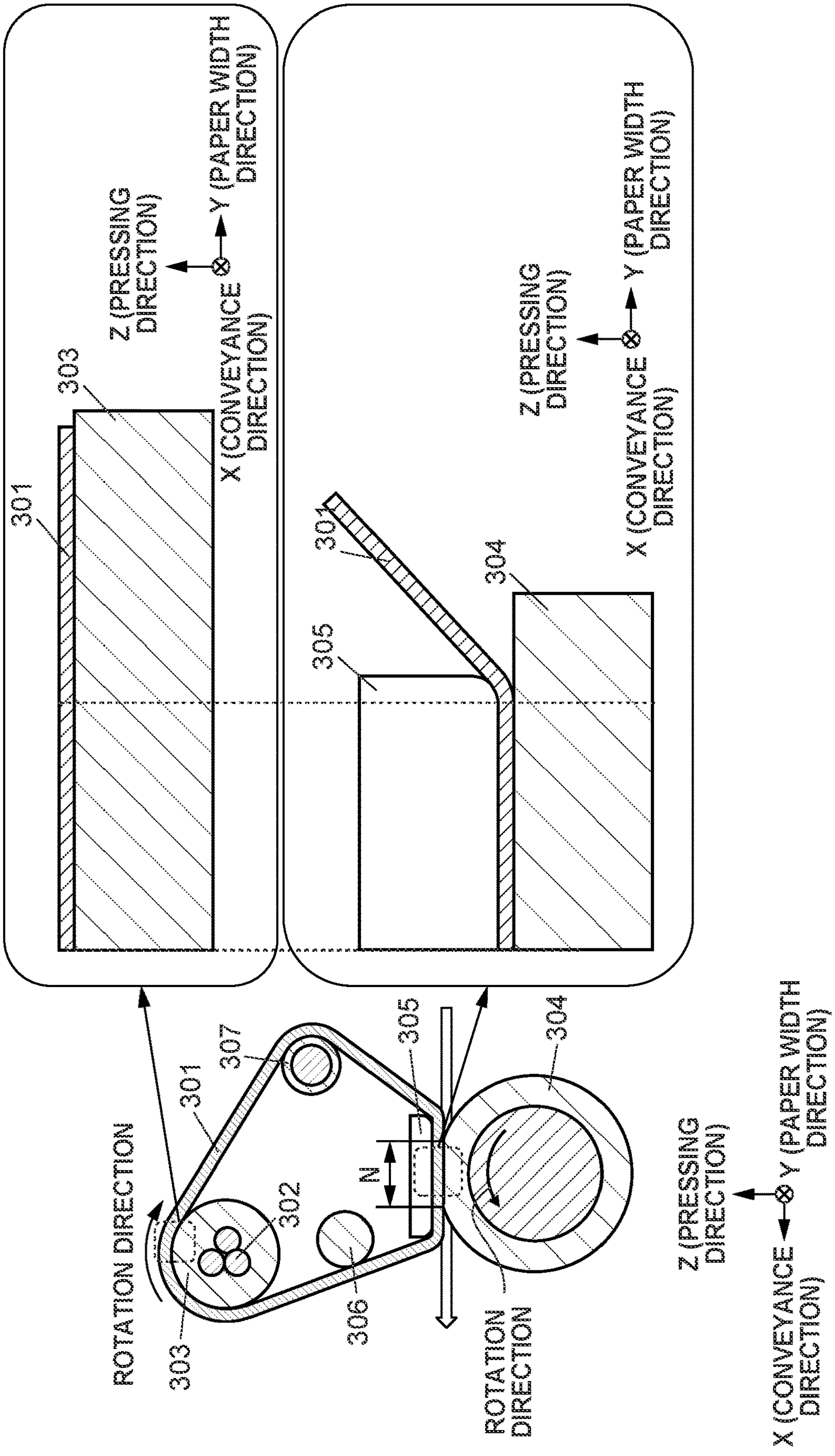
FIG. 4 is an enlarged view illustrating the nip portion according to the present exemplary embodiment.

Cracks in the belt 301 will be described. A fixing belt crack is a phenomenon in which the belt 301 is cracked due to bending fatigue. In the configuration of the present exemplary embodiment, the belt 301 bends at end portions in the width direction of the nip portion N when passing through the nip portion N as illustrated in FIG. 4. The bending occurs every time the belt 301 passes through the nip portion N. The number of times the belt 301 can be bent is limited, and when the limit is reached, a crack occurs in the belt 301.

Therefore, the fixing device of the present exemplary embodiment prevents an occurrence of a crack in the belt 301 while preventing oil leakage. A detailed method is described below.

<Shape of Pad>

The pad 305 of the present exemplary embodiment has a curved shape. The curved shape is formed at a boundary between a first surface 305*a* and a second surface 305*b* of the pad 305.

The pad 305 has the first surface 305*a*, a second surface 305*b*, and the third surface 305*c*. The first surface 305*a* is a surface forming the nip portion N and is bounded by a broken line in FIG. 3. The second surface 305*b* is a surface located at a position facing the first surface 305*a*. More specifically, the second surface 305*b* is a surface that faces the first surface 305*a* in a direction from the pressure roller 304 toward the pad 305. The third surface 305*c* is a surface connecting the first surface 305*a* and the second surface 305*b*. Third surfaces 305*c* are formed at both end portions of the pad 305 in the width direction.

In the present exemplary embodiment, a starting point of the curved shape is the boundary between the first surface 305*a* and the third surface 305*c*. The belt 301 moves away from the pressure roller 304 from the point where the curved shape starts.

A boundary between the second surface 305*b* and the third surface 305*c* is formed into a right-angled shape. Alternatively, the shape may be a curved surface. In the present exemplary embodiment, the boundary between the second surface 305*b* and the third surface 305*c* is formed into the right-angled shape for ease of processing.

The belt 301 is longer than the pad 305 in the width direction, so that the belt 301 is wound around the end portions of the pad 305. Further, the belt 301 is stretched by driving of the heating roller 303 with a stronger force. Thus, stress applied to the end portions of the pad 305, i.e., the boundary between the first surface 305*a* and the third surface 305*c*, becomes strong. In order to reduce the stress, the boundary is formed into the curved shape. The curved shape at the boundary between the first surface 305*a* and the third surface 305*c* can relieve the stress.

Further, during fixing of the recording material, the belt 301 is reciprocated by the steering roller 307 within a predetermined width. While the belt 301 is being reciprocated, the first surface 305*a* of the pad 305 of the present exemplary embodiment is covered with the belt 301. With such a relationship between the lengths, the first surface 305*a* is not exposed from the belt 301, and oil leakage can be prevented.

Figure 5:
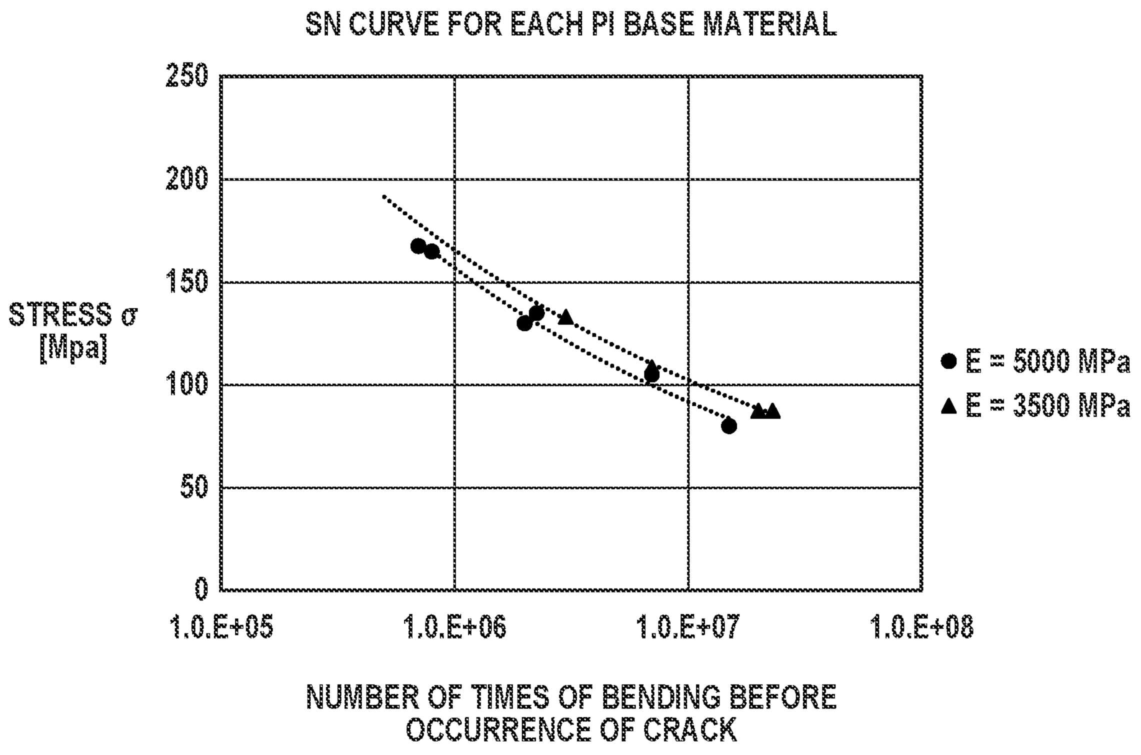
FIG. 5 is a graph for describing durability of a belt according to the present exemplary embodiment.

The number of times the belt 301 can bend varies depending on Young's modulus and a strain & determined by a material of the belt 301. In a configuration of the present exemplary embodiment, polyimide (PI) is used as the material of the belt 301, and the belt 301 is intended to withstand bending of $1.0\times10^6$ times. In order for the fixing belt 301 to withstand $1.0\times10^6$ times of bending, it is necessary to set the stress applied to the belt 301 to 156 megapascal (MPa) or less as illustrated in FIG. 5. In general, when a beam having a thickness t [mm] is bent along an arc having a radius of curvature R, a strain & is expressed by the following formula.

$$\varepsilon = \frac{t}{R} \quad \text{[Math. 1]}$$

A stress σ, Young's modulus E, and the strain & are in a relationship of the following formula.

$$\sigma = E\varepsilon \quad \text{[Math. 2]}$$

Combining the above two formulas yields:

$$\sigma = \frac{Et}{R} \quad \text{[Math. 3]}$$

Therefore, in order to make the stress applied to the belt 301 less than or equal to 156 MPa, the following relationship needs to be satisfied.

$$\frac{Et}{R} \leq 156 \quad \text{[Math. 4]}$$

This formula is transformed into the following formula.

$$\frac{Et}{156} \leq R \quad \text{[Math. 5]}$$

<Oil Leakage>

Figure 6A:
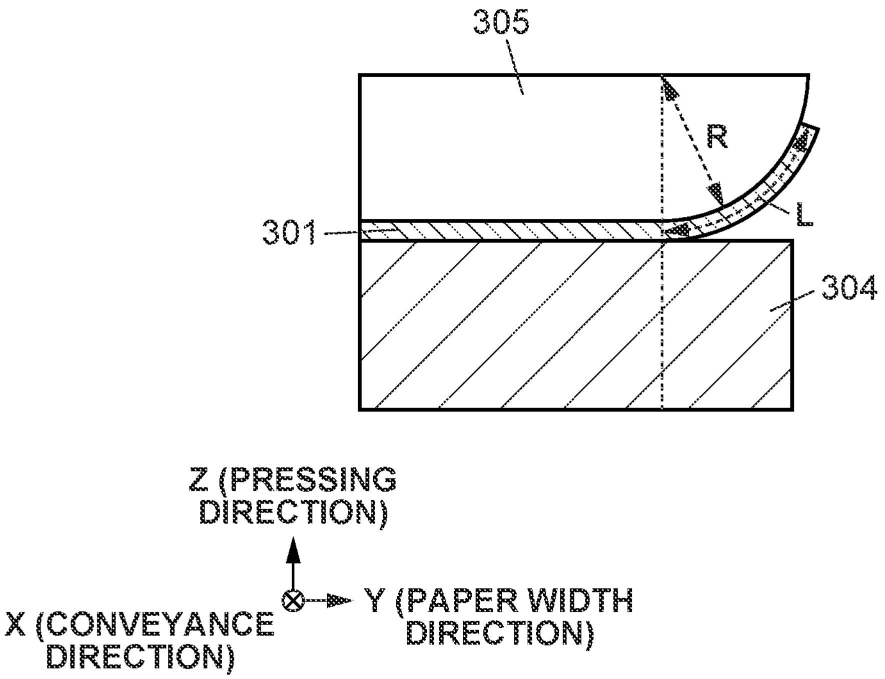
FIGS. 6A and 6B are enlarged views illustrating end portions in a width direction of a pad according to the present exemplary embodiment.
Figure 6B:
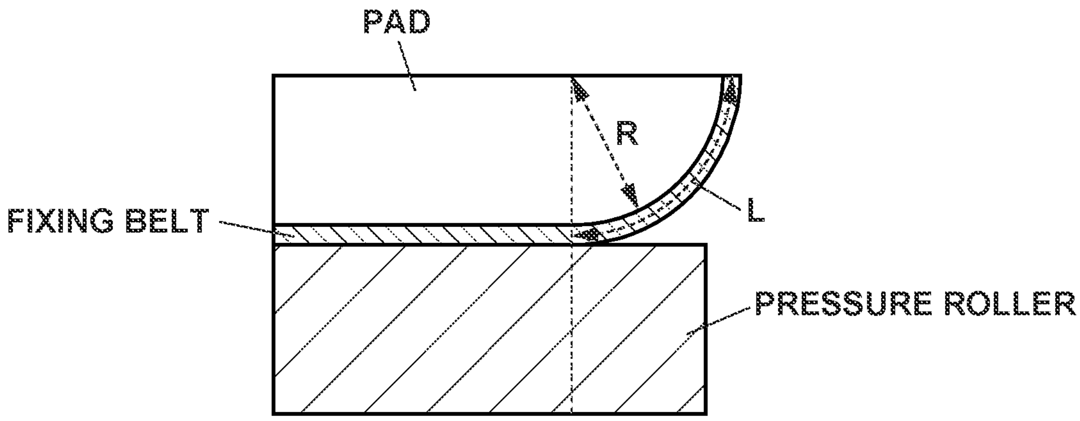

Oil leakage will now be described. The oil leakage is a phenomenon in which the oil applied to the inner circumferential surface of the belt 301 runs down along the pad. The oil having run down contaminates the outer circumferential surface of the belt 301 and the recording material P, causing an image defect. As illustrated in FIGS. 6A and 6B, when the belt 301 is wound around the third surface 305*c* of the pad 305, the oil leakage occurs in a case where a length L [mm] of the pad 305 in contact with the belt 301 on the third surface 305*c* is shorter than an arc length πR/2 of the end portion of the pad 305. In order to prevent the oil leakage, the radius of curvature R [mm] and the length L [mm] of the end portion of the pad 305 need to satisfy the following relationship.

$$R \leq \frac{2L}{\pi} \cong 0.637L \quad \text{[Math. 6]}$$

The length L is desirably less than or equal to 30 mm due to spatial restriction of the belt 301 and the pad 305 inside the image forming apparatus.

From the above description, the condition for achieving both prevention of the fixing belt crack and prevention of the oil leakage can be expressed by the following formula.

$$\frac{Et}{156} \leq R \leq 0.637L \quad \text{[Math. 7]}$$

Hereinafter, the thickness t [mm], the length L, and the radius of curvature R of the end portion of the pad 305 are plotted while changing the Young's modulus E in the configuration of the present exemplary embodiment, and it is verified whether the above inequality for examination is satisfied. Before the verification, parameters used in the verification will be described.

<Various Parameters Measurement Method>

A method for measuring the parameters according to the present exemplary embodiment will be described below with reference to FIG. 3.

A method for measuring the Young's modulus E of the belt 301 will be described. When the Young's modulus is measured, a tensile tester AG-X manufactured by Shimadzu Corporation is used. Attachments to the tensile tester AG-X include a load cell for 500 N and a mechanical parallel clamping fixture for 500 N as a chuck. When a tensile test is performed, the temperature of a thermostatic chamber is set to 180° C., the pulling speed is set to 5 mm/min, and a result of the thickness measured in advance is input. As a thickness measurement value used above, a thickness value of the base layer of the belt 301 having the highest strength among the layers of the belt 301 is input. An elastic modulus is calculated in a range where a load cell test force is from 10 N to 15 N. The measurement is started after confirming that the set temperature of the thermostatic chamber for the tensile test has reached 180° C. The dumbbell shape used in the tensile test is that specified in JIS K7139-A24. After 10 measurements in each of the circumferential direction and the width direction, elastic modulus in the circumferential direction and the width direction are obtained by averaging the respective measurements. The average values in the circumferential direction and the width direction were used as the Young's modulus E [MPa] of the belt 301 in this measurement. When there is a plurality of kinds of belt layers, all of them are treated as one layer, and the above procedure is performed.

A method for measuring the thickness t of the belt 301 will be described. When measuring the thickness, the belt 301 is cut into four equal parts in the Y direction (paper width direction) to prepare samples. The belt thickness was measured using a digital length measuring device CT 6001 manufactured by HEIDENHAIN. The temperature and humidity conditions during the measurement are 23° C. and 30%. The thickness of each of the four equal parts which are the samples was measured at four points in the X direction (sheet passing direction), and an average value of the four equal parts was defined as the belt thickness t [mm]. In this measurement, when the belt has various kinds of layers and a plurality of layers, the thickness of the base layer, excluding the elastic layer and a surface layer, of the belt is measured. When the belt has a layer other than the elastic layer, the surface layer, and the base layer, the thickness of the other layer and the base layer is defined as the belt thickness, and the measurement is performed.

Figure 7:
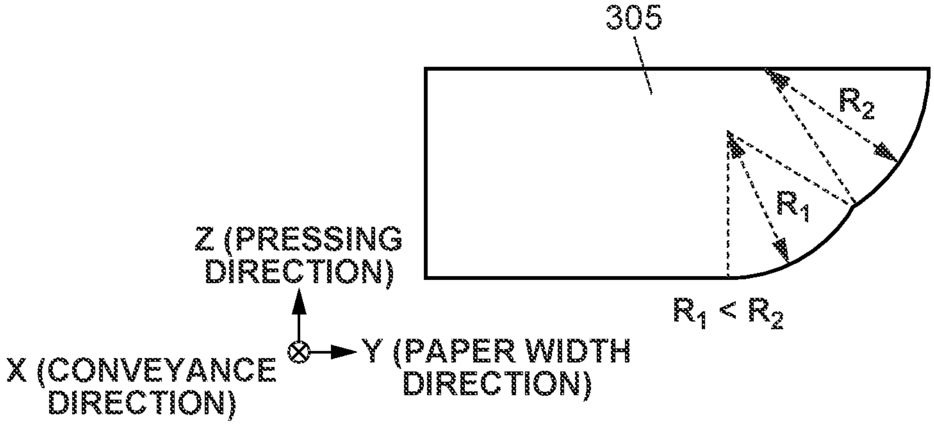
FIG. 7 is a schematic view illustrating a pad according to a modification.

A method for measuring the radius of curvature R of the end portion in the width direction of the pad 305 will be described. A three dimensional shape measuring device VR-3200 manufactured by Keyence Corporation was used for the measurement of the radius of curvature R. The pad 305 was disposed with the surface in contact with the belt 301 facing upward, and the shape of the end portion in the width direction was measured. After the measurement, a cross-sectional shape profile was checked, and a radius of curvature thereof was defined as R [mm]. As illustrated in FIG. 7, when the end portion in the width direction of the pad 305 has a corner having a plurality of radii of curvature, the minimum value is set as the radius of curvature R. In the case of FIG. 7, $R=R_1$.

The length L can be obtained by directly measuring a corresponding portion with a ruler, a scale, or the like. In the present exemplary embodiment, since the position of the belt 301 in the Y direction is controlled by the steering roller 307, the value when this distance is the shortest is used as the length L [mm].

<Fixing Belt Crack Checking Method>

Cracks generated in the belt 301 can be visually recognized. Thus, the entire inner circumferential surface of the belt 301 was observed once, and if no crack was found on the belt 301, it was determined that there was no abnormality.

<Fixing Belt Oil Leakage Checking Method>

A method for checking whether oil leakage of the belt 301 has occurred will be described. In the checking, plain paper having the maximum width usable by the image forming apparatus is used. In the present exemplary embodiment, plain paper of a 330 mm×483 mm size was used. Plain paper for oil leakage checking is passed through the apparatus with the same settings as when the image forming apparatus is usually used. At this time, no image is formed on the plain paper. When the plain paper after being passed through the apparatus is checked and liquid contamination is observed on the paper, it is determined that oil leakage has occurred from the inner circumferential surface of the belt 301. When no contamination is observed on the paper, it is determined that no oil leakage has occurred.

<Verification Procedure and Verification Results>

The fixing belt crack and the fixing belt oil leakage were verified using the configuration of the present exemplary embodiment. The procedure and results will be described.

Figure 8A:
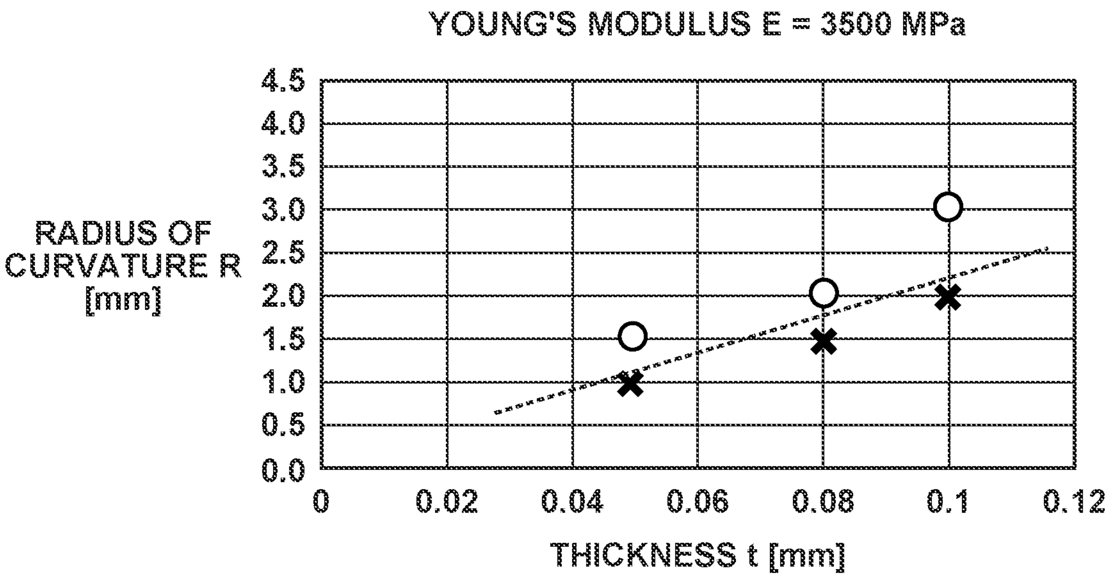
FIGS. 8A and 8B are graphs for describing durability of the belt according to the present exemplary embodiment.
Figure 8B:
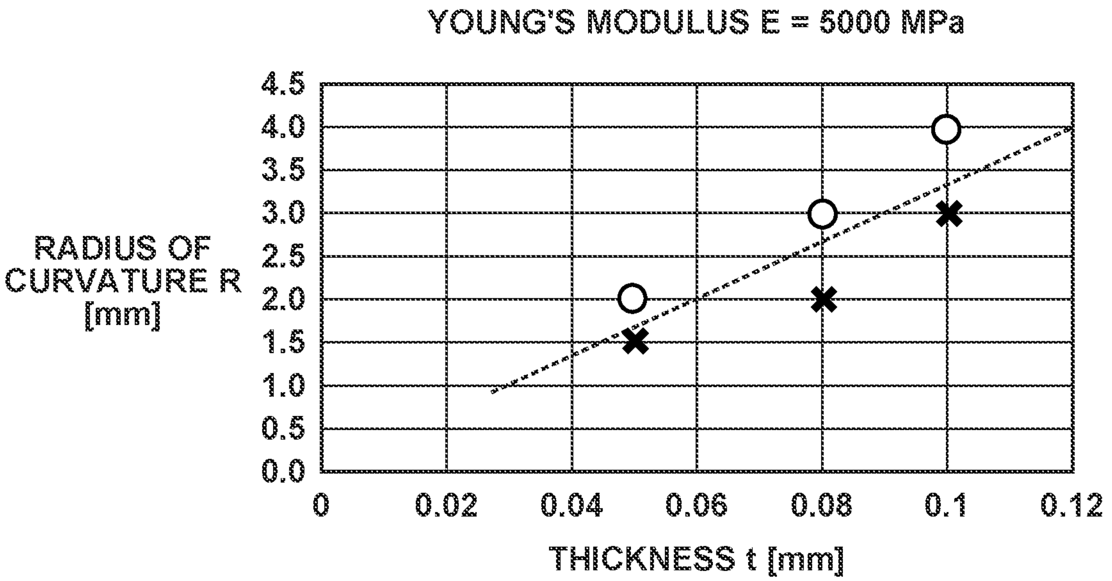

First, conditions under which a crack does not occur in the fixing belt were verified. First, the procedure will be described. The fixing device having the configuration of the present exemplary embodiment was operated, and the belt 301 was rotated $1.0\times10^6$ times in a state in which the nip portion N was formed. After the rotation, the belt 301 was taken out from the fixing device, and the presence or absence of a crack was examined by the above-described method. The results of the verification are illustrated in FIGS. 8A and 8B. In the graphs of FIGS. 8A and 8B, o indicates a condition under which no crack occurred, and x indicates a condition under which a crack occurred. In the graph of FIG. 8A, where E=3500 MPa, it was confirmed that no crack occurred in the following range in the belt 301.

$$22.4t \le R \qquad \text{[Math. 8]}$$

In the graph of FIG. 8B, where E=5000 MPa, it was confirmed that no crack occurred in the following range in the belt 301.

$$33.2t \le R \qquad \text{[Math. 9]}$$

Therefore, it was confirmed that the condition under which no crack occurs when the Young's modulus E of the belt 301 was in the range of 3500 MPa to 5000 MPa can be expressed as follows.

$$\frac{Et}{156} \le R \qquad \text{[Math. 10]}$$

Figure 9A:
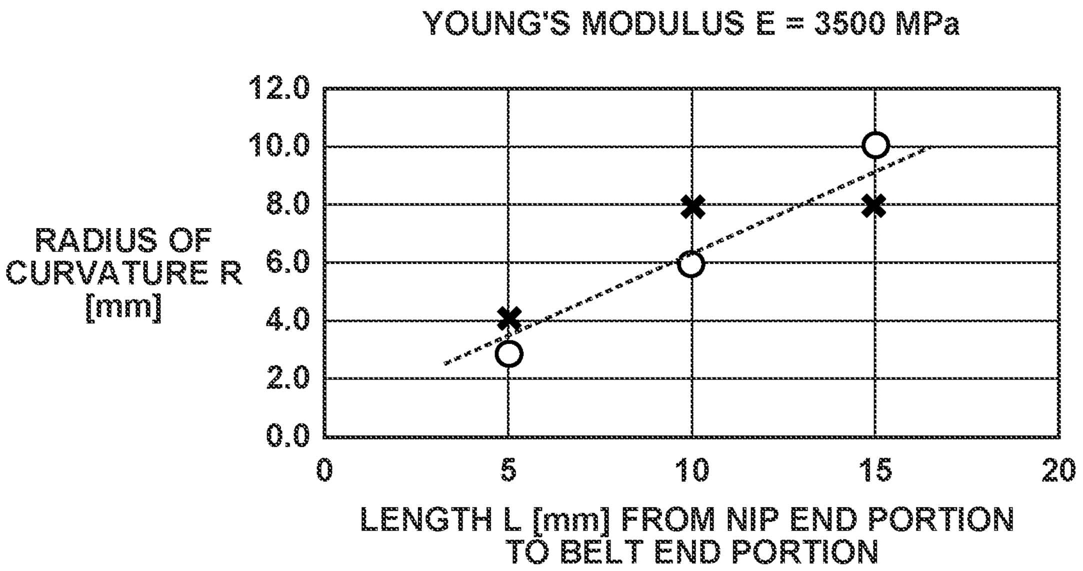
FIGS. 9A and 9B are graphs for describing oil leakage of the belt according to the present exemplary embodiment.
Figure 9B:
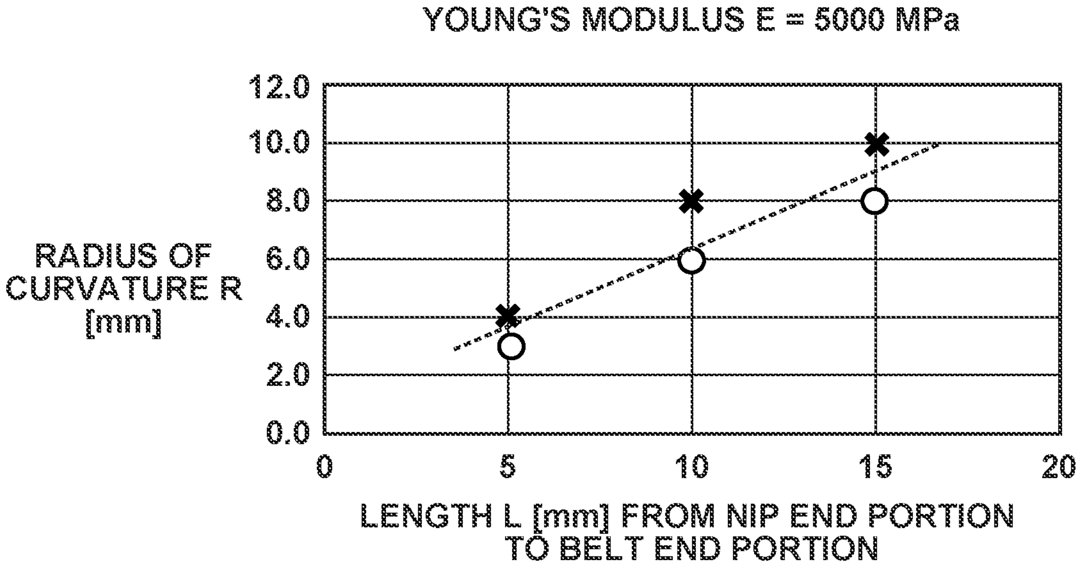

Next, a condition under which oil leakage from the fixing belt does not occur was verified. First, the procedure will be described. The fixing device having the configuration of the present exemplary embodiment was operated, and the belt 301 was rotated $1.0\times10^4$ times (the number of rotations at which there was no possibility of the fixing belt crack occurring and there was no influence) in a state in which the nip portion N was formed. Thereafter, the presence or absence of oil adhesion to the plain paper was examined by the above-described method for checking oil leakage from the fixing belt. The results of the verification are illustrated in FIGS. 9A and 9B. In the graphs of FIGS. 9A and 9B, ○ indicates a condition under which no oil leakage occurred, and x indicates a condition under which oil leakage occurred. From comparison between FIG. 9A and FIG. 9B, the condition under which oil leakage occurs does not change in the range of the Young's moduli E of the present exemplary embodiment, but changes depending on the length L, and no oil leakage occurs in the following range.

$$R \le 0.637L \qquad \text{[Math. 11]}$$

Therefore, it was confirmed that the condition under which no oil leakage occurs can be expressed as follows using the length L and the radius of curvature R of the end portion in the width direction of the pad 305.

$$R \le 0.637L \qquad \text{[Math. 12]}$$

From the verification results of the fixing belt crack and the oil leakage, it is possible to determine the range of the radius of curvature R of the end portion in the width direction of the pad 305 which does not cause both of the fixing belt crack and the oil leakage as follows.

$$\frac{Et}{156} \le R \le 0.637L \qquad \text{[Math. 13]}$$

In order to verify validity of this range, the fixing device having the configuration of the present exemplary embodiment was operated under the conditions illustrated in FIGS. 10A, 10B, 10C, and 10D, and the belt 301 was rotated $1.0\times10^6$ times in the state in which the nip portion N was formed, and then the checking for the fixing belt crack and the oil leakage was performed. As illustrated in FIGS. 10A, 10B, 10C, and 10D, under a condition where the radius of curvature R of the end portion in the width direction of the pad 305 was within the range of the above inequality, neither the fixing belt crack nor the oil leakage occurred. Therefore, the validity of this inequality for examination was verified.

As illustrated in FIGS. 10A, 10B, 10C, and 10D, the Young's modulus E of the belt is preferably within the range of 3500 MPa to 5000 MPa. Further, the thickness of the belt is preferably within the range of 0.08 mm to 0.1 mm. The length L is preferably within the range of 5 mm to 10 mm.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-014988, filed Feb. 3, 2023, which is hereby incorporated by reference herein in its entirety.

What is claimed is:

1. A fixing device comprising:

an endless belt configured to heat a recording material and having an inner circumferential surface coated with oil;

a pressure roller contacting an outer circumferential surface of the endless belt to form a nip portion; and a pad disposed on the inner circumferential surface of the endless belt and configured to form the nip portion together with the pressure roller via the endless belt, wherein the pressure roller applies heat and pressure to the recording material carrying a toner image at the nip portion together with the endless belt to fix the toner image to the recording material, wherein a length of the endless belt is larger than a length of the pad in a width direction of the endless belt, and the pad includes a first surface forming the nip portion, a second surface facing the first surface, and a third surface connecting the first surface and the second surface in the width direction and formed in a conveyance direction of the recording material, wherein the width direction of the endless belt is orthogonal to the conveyance direction of the recording material, wherein the third surface has a curved shape in a cross section orthogonal to the conveyance direction of the recording material, and wherein the third surface satisfies the following formula:

$Et/156 \leq R \leq 0.637$ L, where L [mm] is a length of the third surface in contact with the endless belt, E [MPa] is a Young's modulus of the endless belt, t [mm] is a thickness of the endless belt, R [mm] is a radius of curvature of the curved shape, and 156 indicates 156 MPa.

2. The fixing device according to claim 1, further comprising a steering roller configured to suspend the endless belt and swing to control a position of the endless belt in the width direction, wherein the steering roller is positioned upstream of the pad in a rotation direction of the endless belt.

3. The fixing device according to claim 1, wherein a radius of curvature of the curved shape of the third surface is in a range of 2.0 mm to 6.0 mm.

4. The fixing device according to claim 3, wherein a radius of curvature of the curved shape of the third surface is in a range of 4.0 mm to 6.0 mm.

5. The fixing device according to claim 4, wherein a Young's modulus of the endless belt is in a range of 3500 MPa to 5000 MPa.

6. The fixing device according to claim 5, wherein a thickness of the endless belt is in a range of 0.08 mm to 0.1 mm.

7. The fixing device according to claim 6, wherein a length over which the third surface is in contact with the endless belt in a widthwise direction is in a range of 5 to 10 mm.

8. The fixing device according to claim 1, further comprising an oil application roller configured to apply oil to the endless belt.

9. An image forming apparatus configured to form an image on a recording material, the image forming apparatus comprising:

a fixing device including:

an endless belt configured to heat a recording material and having an inner circumferential surface coated with oil;

a pressure roller contacting an outer circumferential surface of the endless belt to form a nip portion; and a pad disposed on the inner circumferential surface of the endless belt and configured to form the nip portion together with the pressure roller via the endless belt, wherein the pressure roller applies heat and pressure to the recording material carrying a toner image at the nip portion together with the endless belt to fix the toner image to the recording material, wherein a length of the endless belt is larger than a length of the pad in a width direction of the endless belt, and the pad includes a first surface forming the nip portion, a second surface facing the first surface, and a third surface connecting the first surface and the second surface in the width direction and formed in a conveyance direction of the recording material, wherein the width direction of the endless belt is orthogonal to the conveyance direction of the recording material, wherein the third surface has a curved shape in a cross section orthogonal to the conveyance direction of the recording material, and wherein the third surface satisfies the following formula:

$Et/156 \leq R \leq 0.637$ L, where L [mm] is a length of the third surface in contact with the endless belt, E [MPa] is a Young's modulus of the endless belt, t [mm] is a thickness of the endless belt, R [mm] is a radius of curvature of the curved shape, and 156 indicates 156 MPa; and a steering roller configured to suspend the belt and swing to control a position of the endless belt in the width direction, wherein the first surface is covered with the endless belt in the width direction during image formation in which the image forming apparatus forms an image on a recording material.

* * * * *